(No Model.)
C. E. LUBURG.
SUPPORT FOR BICYCLE SADDLES.
No. 510,275. Patented Dec. 5, 1893.
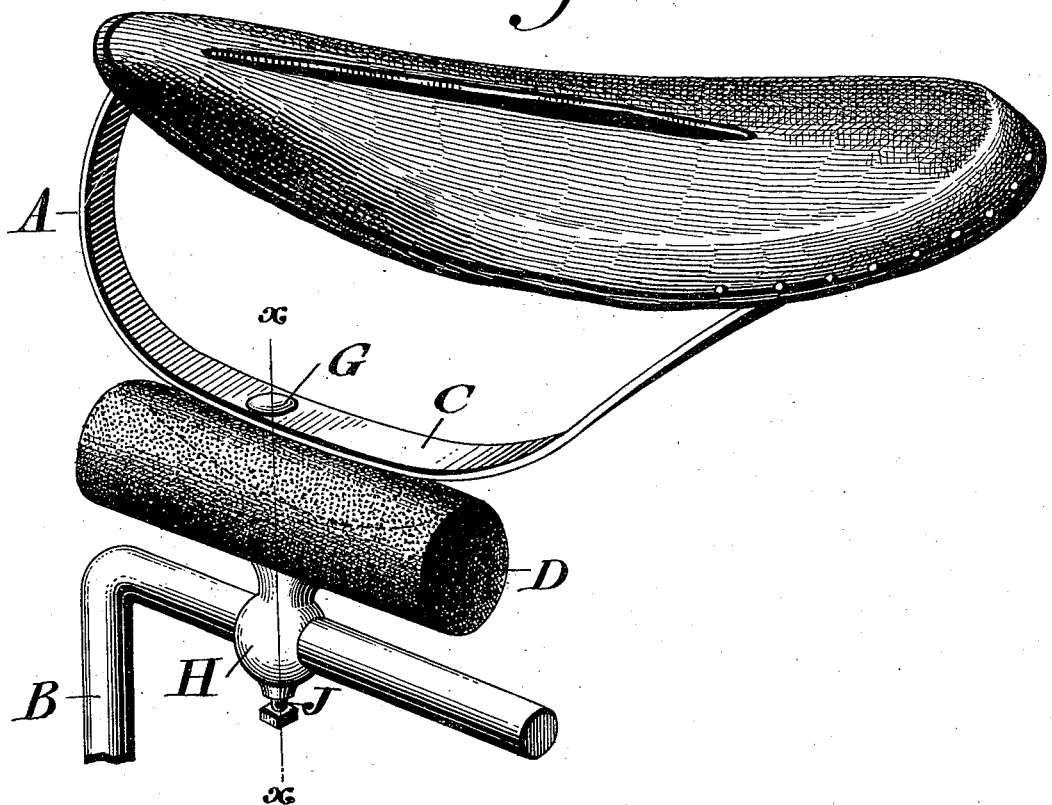
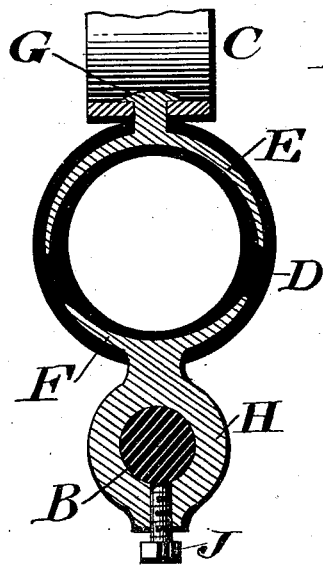
WITNESSES:
P. H. Cagle.
L. Douville.
INVENTOR
Charles E. Luburg
BY John A. Wiederstein
ATTORNEY.

UNITED STATES PATENT OFFICE.

CHARLES E. LUBURG, OF PHILADELPHIA, PENNSYLVANIA, ASSIGNOR TO THE LUBURG MANUFACTURING COMPANY, OF PENNSYLVANIA.

SUPPORT FOR BICYCLE-SADDLES.

SPECIFICATION forming part of Letters Patent No. 510,275, dated December 5, 1893.

Application filed November 8, 1892. Serial No. 451,312. (No model.)

*To all whom it may concern:*

Be it known that I, CHARLES E. LUBURG, a citizen of the United States, residing in the city and county of Philadelphia, State of Pennsylvania, have invented a new and useful Improvement in Supports for Bicycle-Saddles, which improvement is fully set forth in the following specification and accompanying drawings.

My invention consists of the provision in a bicycle of a pneumatic support for the saddle thereof, as will be hereinafter fully set forth.

Figure 1 represents a perspective view of a portion of a bicycle embodying my invention. Fig. 2 represents a section on line $x, x$, Fig. 1 on an enlarged scale.

Similar letters of reference indicate corresponding parts in the two figures.

Referring to the drawings: A designates the saddle of a bicycle and B designates the support or supporting arm thereof. Interposed between the base piece or part C of the frame of the saddle is a closed tube D, of any suitable material which is adapted to be inflated and support the saddle of the bicycle, the same having embedded in it, or otherwise secured to it at opposite upper and lower places respectively, the shoes E and F. Rising from the shoe E is a rivet G, which is secured to the part C of the saddle, and depending from the shoe F is the boss H, which has the support B connected with it. The said boss or clamp H is adjustable on said support B, and is secured thereto by means of the clamping screw J. It will be seen that the tube which is pneumatic in its nature, provides a cushion of great resiliency, whereby the saddle is supported in such manner that it renders service to the rider in a most comfortable and easy manner.

I do not limit myself to the manner of securing the tube or cushion to the saddle and the support thereof, as any kind of clips, clamps or other fastenings may be employed for such purpose, nor do I limit myself to the style of saddle or support therefor, as the same may be variously constructed, but Having fully described my invention, what I claim as new, and desire to secure by Letters Patent, is—

1. A support for a bicycle saddle consisting of the pneumatic tube D having connected therewith on its upper side, a rigid shoe which is adapted to be secured to the frame of the saddle, and on the opposite side a rigid shoe provided with a clamp adjustable on a supporting arm of the bicycle, said parts being combined substantially as described.

2. A bicycle having the supporting arm B, the saddle A with frame C, the pneumatic tube D with the shoes E and F therein, said shoe E having a rivet securing it to the frame C, and the shoe F having a clamp H securing it to the arm B, said parts being combined substantially as described.

CHARLES E. LUBURG.

Witnesses:
JUDSON D. MCKEE,
HARRY L. WARNER.